United States Patent
Franc et al.

(10) Patent No.: US 9,619,677 B2
(45) Date of Patent: Apr. 11, 2017

(54) COMMUNICATION METHOD FOR THE PURPOSE OF CONFIGURATION AND/OR INTERROGATION, AND SYSTEM USING SAME

(75) Inventors: Joël Franc, Eckbolsheim (FR); Rémy Kirchdoerffer, Grancy (CH)

(73) Assignee: SENSTRONIC (SOCIETE PAR ACTIONS SIMPLIFIEE), Saverne (FR)

( * ) Notice: Subject to any disclaimer, the term of this patent is extended or adjusted under 35 U.S.C. 154(b) by 291 days.

(21) Appl. No.: 14/240,639

(22) PCT Filed: Aug. 21, 2012

(86) PCT No.: PCT/FR2012/051914
§ 371 (c)(1),
(2), (4) Date: Apr. 9, 2014

(87) PCT Pub. No.: WO2013/026986
PCT Pub. Date: Feb. 28, 2013

(65) Prior Publication Data
US 2014/0225717 A1    Aug. 14, 2014

(30) Foreign Application Priority Data
Aug. 23, 2011    (FR) ..................................... 11 57470

(51) Int. Cl.
*G06K 7/10* (2006.01)
*H02J 13/00* (2006.01)
*H04B 3/54* (2006.01)

(52) U.S. Cl.
CPC ........... *G06K 7/10* (2013.01); *G06K 7/10009* (2013.01); *H02J 13/0024* (2013.01); *H04B 3/548* (2013.01); *H04B 2203/547* (2013.01)

(58) Field of Classification Search
CPC ... G06K 7/10; G06K 7/10009; H02J 13/0024; H04B 2203/547; H04B 3/548
See application file for complete search history.

(56) References Cited

U.S. PATENT DOCUMENTS

| | | |
|---|---|---|
| 2010/0250911 A1 | 9/2010 | Trebbels et al. |
| 2010/0268496 A1 | 10/2010 | Trebbels et al. |
| 2010/0315257 A1 | 12/2010 | Trebbels et al. |

FOREIGN PATENT DOCUMENTS

| | | |
|---|---|---|
| EP | 0 370 921 A1 | 5/1990 |
| EP | 1 278 077 A2 | 1/2003 |
| EP | 1 538 458 A1 | 6/2005 |
| EP | 1 600 736 A1 | 11/2005 |
| WO | 01/54298 A1 | 7/2001 |

OTHER PUBLICATIONS

International Search Report, dated Nov. 30, 2011, from corresponding PCT application.

*Primary Examiner* — Sisay Yacob
(74) *Attorney, Agent, or Firm* — Young & Thompson

(57) ABSTRACT

A method for communication, intended in particular for the purpose of a configuration, calibration, parameterization, interrogation or even a test or diagnosis, between a master device and a slave product including at least a processing unit and a direct current power supply line or input, and, if necessary, at least one output line and/or output interface. The method includes transmitting to the product data that can be interpreted by the processing unit thereof, the data being transmitted via the power supply line and by modulating the supply voltage.

20 Claims, 7 Drawing Sheets

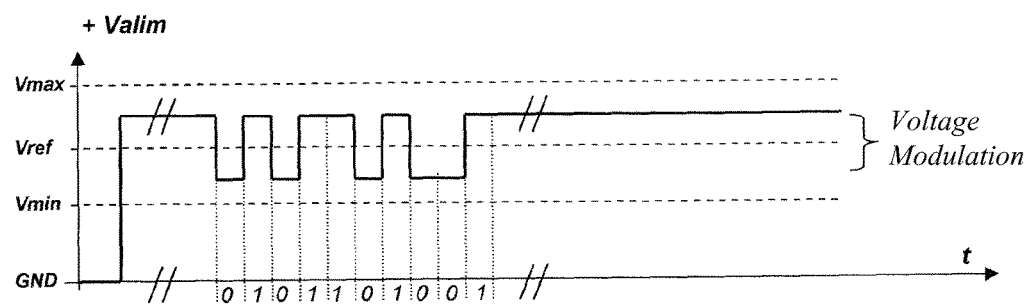
Fig. 4A
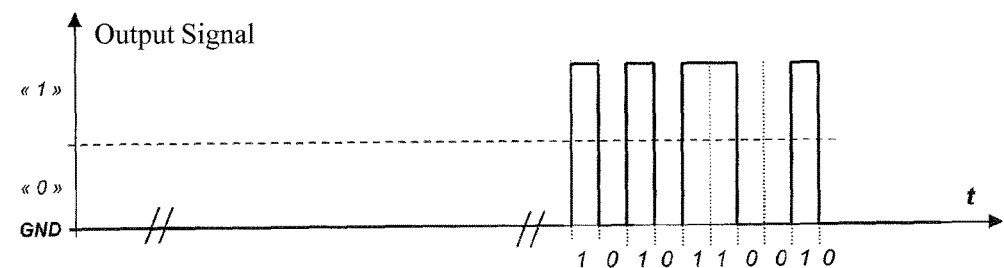
Fig. 4B
Fig. 4

COMMUNICATION METHOD FOR THE PURPOSE OF CONFIGURATION AND/OR INTERROGATION, AND SYSTEM USING SAME

BACKGROUND OF THE INVENTION

The invention relates to the field of the communication and transmission of data. More particularly, the invention is useful within the framework of communication between a device for configuration, interrogation and/or diagnosis and a so-called "smart" product, such as an assembly of a sensor, detector, actuator or a similar functional product, integrating at least one processing unit.

The invention provides a method for communication between such a device and such a product, as well as a system implementing this method.

The products targeted in this invention are generally permanently installed, after their activation, at particular sites that are reserved for them (industrial sites, public sites, private sites).

In their running operation, these products are connected in a known manner to one or more remote systems(s) ensuring their power supply and evaluating and/or exploiting signals of measurement (logic or analog) that they deliver as output. As a variant, the power supply can also be directly provided by the external power grid or a suitable local power grid. The type of communication and transmission targeted more particularly in this application is a temporary communication established between such a product and a device of the type mentioned above during the particular phases of the life of the product, namely, for example, phases of configuration, calibration, parameterization, interrogation, testing or diagnosis, each of these phases optionally being able to be repeated multiple times, and even at regular intervals.

During these temporary and specific communication phases, the device is generally a master unit, and the product is a slave unit.

Even when a product of the above-mentioned type does not have a user interface (display, keyboard, . . . ), it is nevertheless often useful for it to be able to have a communication method during its manufacture and/or its installation (diagnosis and/or calibration) and/or during its use (configuration, interrogation, . . . ) by a suitable means.

This possibility consequently makes it possible to configure all or part of the functional characteristics of the product or else to be able to interrogate it to recover any type of data that would be stored therein (data acquired during periods of autonomous and running operation relative to the above-mentioned device of the product).

Currently, in this case, a specific means of wire connection (generally implemented by a connector dedicated to the communication) or a wireless communication means (optics, radio, RFID, magnetic coupling, . . . ) is necessary to the product to make it possible for it to communicate with the user via an external device.

DESCRIPTION OF THE RELATED ART

Such solutions requiring a dedicated connection or link are known in particular from the following documents: US-A-2010/0315257, US-A-2010/0268496, US-A-2010/0250911, EP-A-1 278 077, EP-A-1 538 458 and EP-A-1 600 736.

In addition, a communications system comprising a local station powered from the outside and at least one remote station is known from the document WO-A-01/54298.

The remote station is permanently connected to the local station by a two-wire link for the power supply and the bidirectional data transmission. A specific device for the return two-wire communication (remote→local) should consequently be provided at the remote station, and the latter cannot operate in an independent or autonomous manner (relative to the local station).

A similar system comprising a central unit connected to modules by a two-wire link for supplying and exchanging data is known from the document EP-A-0 370 921.

SUMMARY OF THE INVENTION

This invention provides a temporary communications solution for so-called "smart" products, comprising at least one power supply line and operating in normal time in an independent, and even autonomous, manner, a solution that should not require dedicated or specific communications linking means (wire or wireless) and at most should cause only a minimal modification at the product.

For this purpose, the invention provides a method for communication between a device for configuration, interrogation and/or diagnosis that is a master unit for the period of the communication and a product such as an actuator, pre-actuator, sensor or detector that is a slave unit for the period of the communication, with the slave product comprising at least one processing unit and a direct current power supply input or power supply line, as well as at least one output line and/or output interface, with the slave product being independent of the device in running operation and connected to the device for the purpose of a configuration, a calibration, a parameterization, an interrogation, a test, or diagnosis.

The method comprises transmitting to the product data that can be interpreted by its processing unit by means of the power supply line, by creating a modulation of the power supply voltage and optionally in transmitting data back from the product to the device by means of the output line or output interface connected to the device.

The invention implements the above-mentioned method using a device for configuration and/or interrogation and at least one configurable and/or interrogatable product, respectively master and slave during the communication, with the or each product consisting of a smart product that is selected from the group that is formed by the actuators, the pre-actuators, the sensors and the detectors that are smart and being able to be connected to the device by means of its direct current power supply line, as well as, if necessary, by its output line or its output interface.

The product comprises at least one processing unit, and preferably at least one other functional component or element.

The invention includes a system where the device and each product comprises functionally complementary respective means for the transmission of the device to the or each product of data that can be interpreted by the processing unit in question, the transmission being performed by means of the power supply line and via a modulation of the power supply voltage, and in that the or each product integrates an output interface or an output stage connected to an input stage or an input interface of the device, allowing a wire transmission of data from the product or products to the device, in the form of binary or analog signals.

BRIEF DESCRIPTION OF THE DRAWING FIGURES

The invention will be better understood, thanks to the description below, which relates to preferred embodiments, provided by way of nonlimiting examples and explained with reference to the accompanying diagrammatic drawings, in which:

FIGS. 4A and 4B are timing diagrams illustrating, by way of examples, respectively the signals transmitted to the product (from the device) via the power supply line (FIG. 4A) and the signals transmitted to the device (from the connected product) via the output line and/or the output interface (FIG. 4B);

Figure 3:
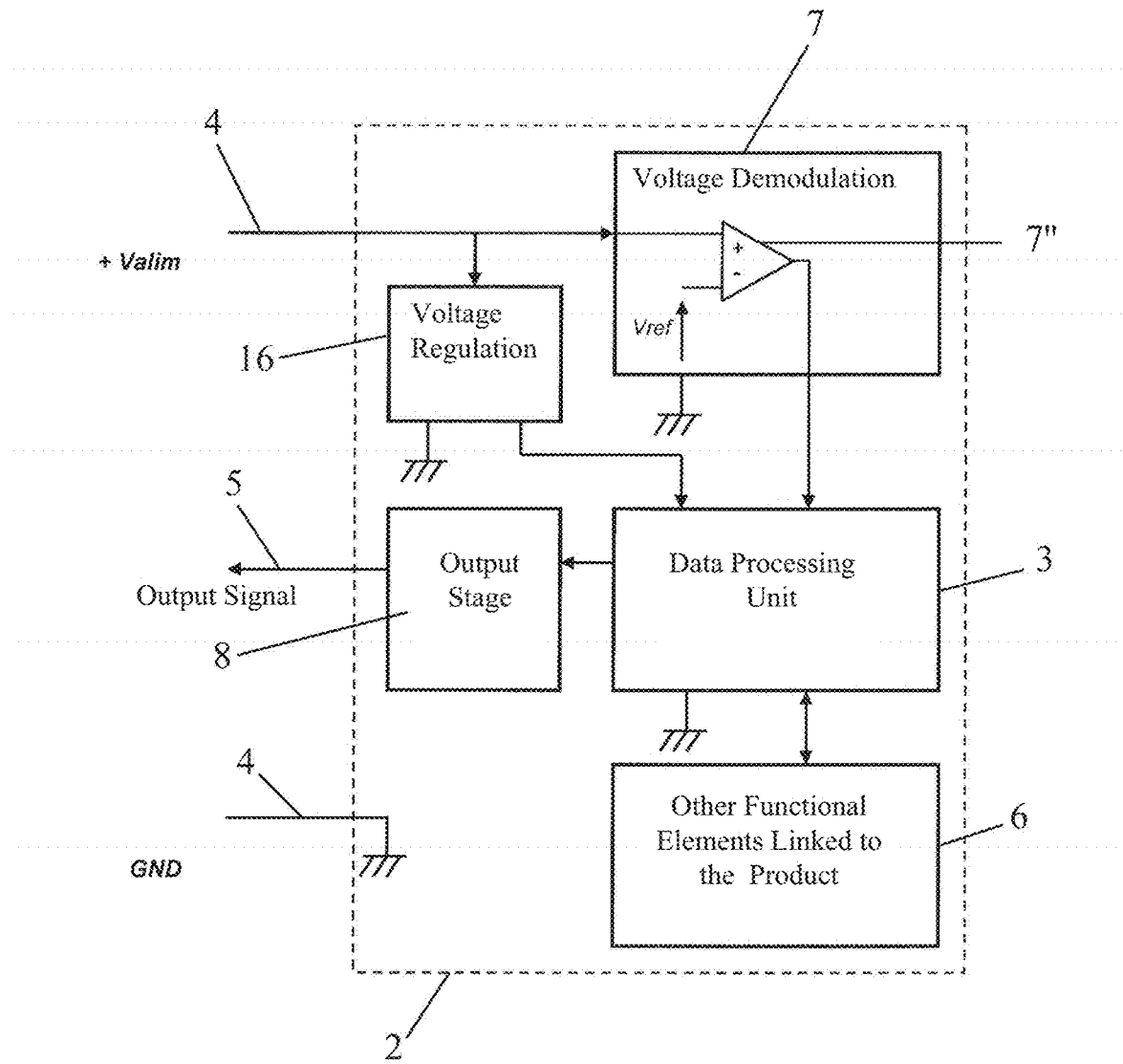
FIG. 3 is a synoptic representation of a slave product that is part of the system for the implementation of the method according to the invention.
Figure 6:
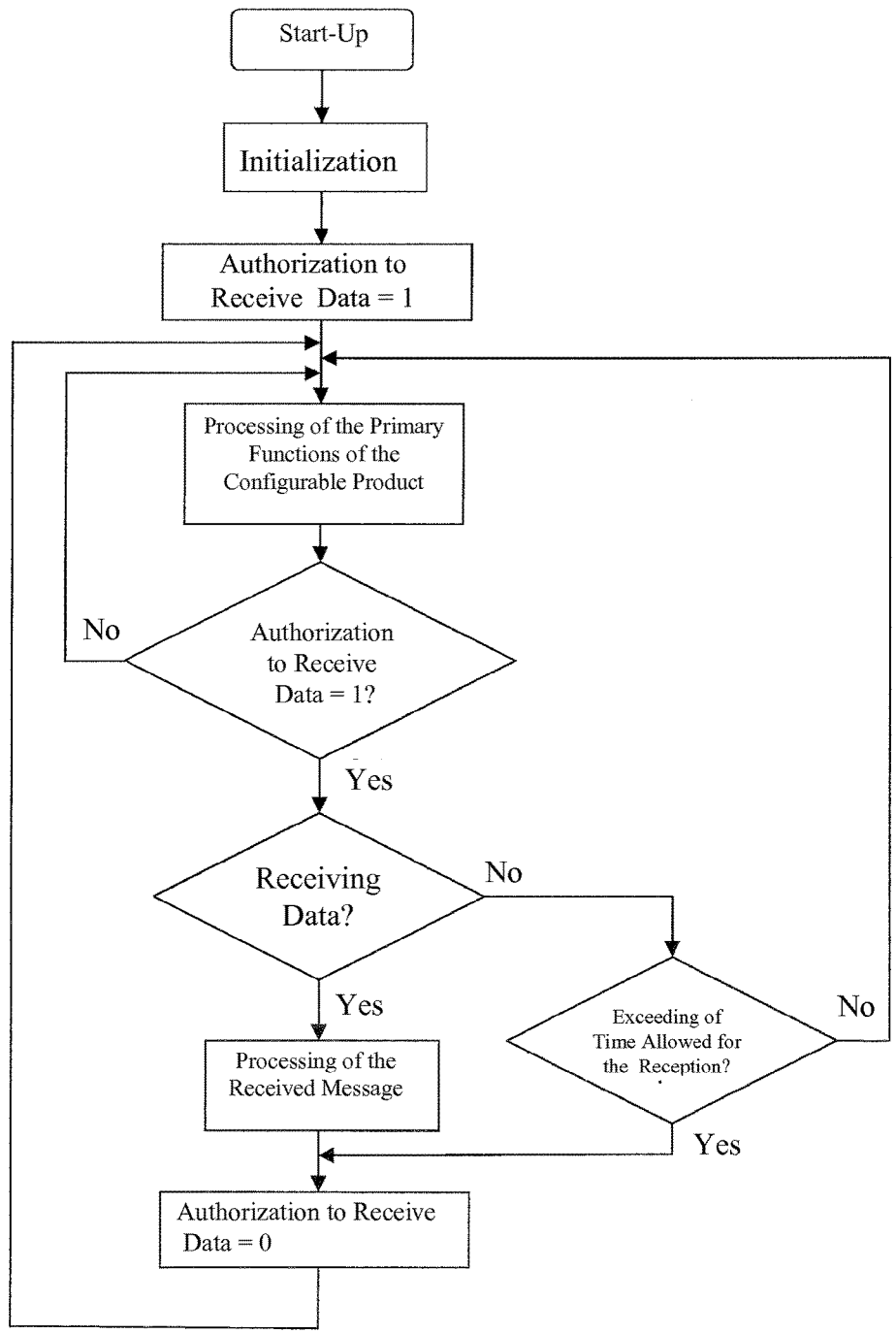
Figure 7A:
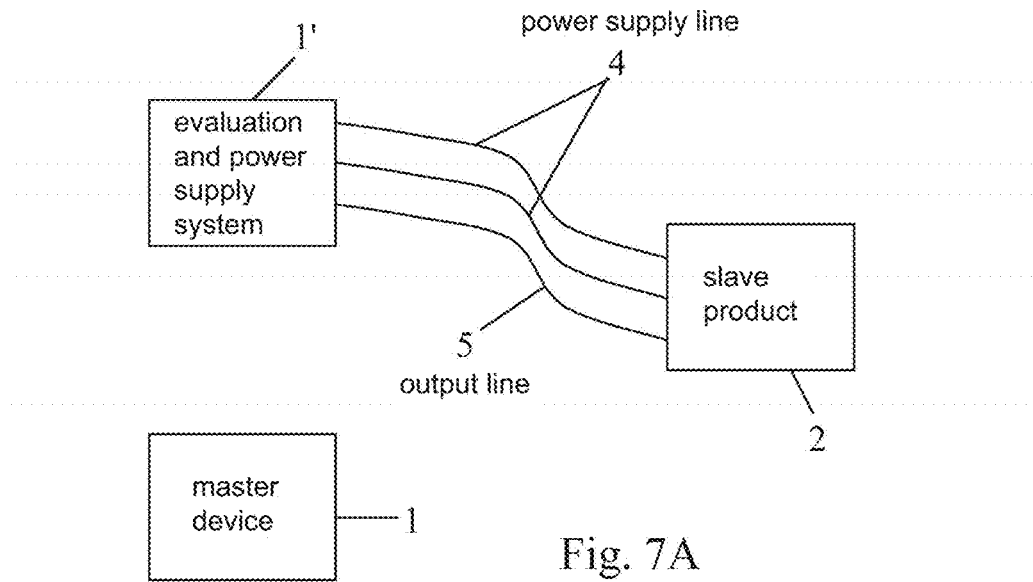
Figure 7B:
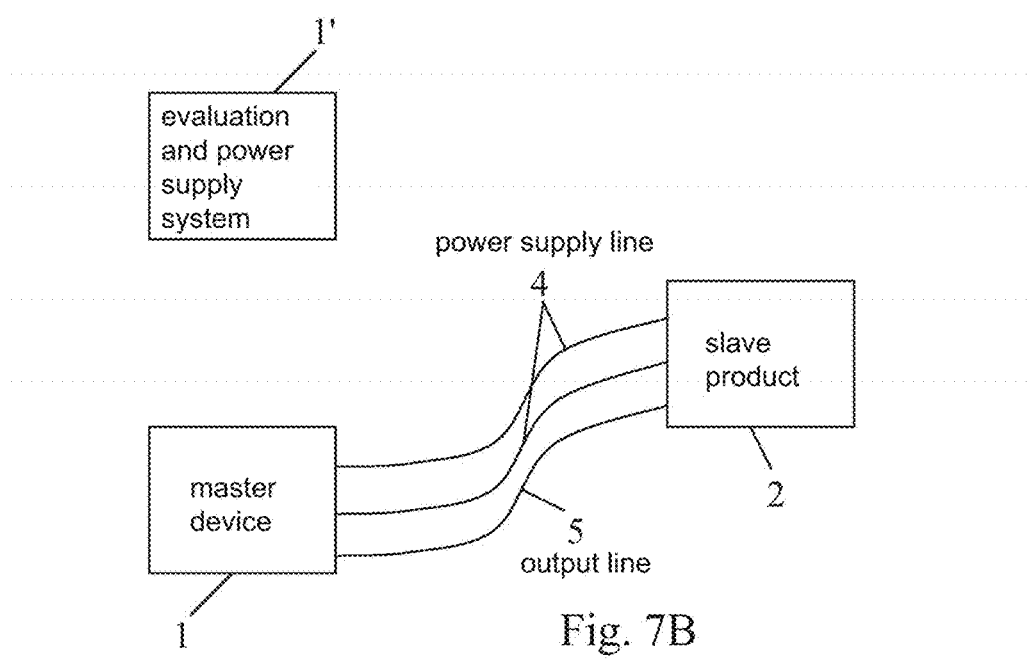

FIG. 6 is a logic diagram illustrating the stages of a procedure example followed by the product of FIG. 3 when data are received via the power supply line, and FIGS. 7A and 7B diagrammatically illustrate the connection configurations respectively, on the one hand, between the product and a system for evaluation and power supply (in running operation) and, on the other hand, between the interrogation and configuration device and the product (during the communication phases according to the invention).

DESCRIPTION OF THE PREFERRED EMBODIMENTS

Generally, the invention relates to a method for communication between a device 1 and a product 2, where, for the period of the communication, the device 1 acts as a master unit and the product 2 acts as a slave unit.

The device 1 is for configuration, interrogation and/or diagnosis and the product 2 for example may be an actuator, pre-actuator, sensor or detector.

With reference to FIG. 3, the product 2 comprises at least one data processing unit 3 and a direct current power supply input or power supply line 4, as well as at least one output line and/or output interface 5. In normal running operation, the product 2 is independent of the device 1. The product 2 is connected to the device 1 for the purpose of a configuration, a calibration, a parameterization, an interrogation, a test, or a diagnosis.

As indicated above, the invention has as its object to provide a solution for parameterization and for wired communication, under specific temporary conditions, for any type of product 2 originally using both a direct current external power supply line 4 (two-wire), an output interface or output line 5, and a data processing unit 3 (MCU, ASIC, ASSP, . . . ), without thereby resorting to specific data lines or to a dedicated connector.

For this purpose, the communication method targeted by the invention comprises the device 1 transmitting data to the product 2 by the power supply line 4, by producing a modulation of the power supply voltage and optionally in transmitting data back from the product 2 to the device 1 by means of the output line or output interface 5 connected to the device 1. The transmitted data can be interpreted by the product's processing unit 3.

One skilled in the art understands that the communication link, and simultaneously the power supply link, between the product 2 and the device 1 is a temporary link, established in particular operating phases of the "active" life of the product 2.

Based on the type of product, its capacities, its common use and particular protocols linked to the application, these operating phases can comprise operations for the purpose of a configuration, a calibration, a parameterization, an interrogation, a test, or a diagnosis.

These operations that bring about a temporary connection with the device 1 (and therefore the detachment of its normal functional connection) can, based on their nature, be carried out before, during or after the current use of the product 2 in question, i.e., its normal use in operation (during which it fills the role for which it was designed, such as, for example, detection, measurement, actuation . . . while being powered and connected as output to different means of the device 1).

Preferably, the data are transmitted, during communication phases of a link between the device 1 and the product 2, in asynchronous serial form, and the modulation of the voltage is done within a specified range of values, compatible with a satisfactory supply of power to the product 2.

The data and information transmitted to the product 2 can be of different nature, in particular in relation to the context and the circumstances of the communication.

Thus, the data transmitted by the power supply line 4 can consist of a message for configuration or parameterization of at least one function and/or at least one functional element 6 of the product 2.

However, the data transmitted by the power supply line 4 can also consist of a message of interrogation, causing a transmission of data back from the product 2 to the device 1 by means of the output line or output interface 5 connected to the device 1, with the data transmitted back being, if necessary, data stored in the processing unit 3 or an attached storage circuit of the latter and/or resulting from operations performed by the processing unit 3 by one or more other functional element(s) 6 of the product, under the control of the latter.

Finally, the data transmitted by the power supply line 4 can also include a message requesting a test or diagnosis, causing a transmission of data back from the product 2 to the device 1 via the output line or output interface 5 connected to the device 1, with the data transmitted back being, if necessary, data stored at the processing unit 3 or an attached storage circuit of the latter and/or resulting from operations carried out by the processing unit 3 by one or more other functional element(s) 6 of the product, under the control of the latter.

For the purpose of the acquisition of data emitted by the device 1, it may advantageously carry out a scanning of the power supply voltage, if necessary after a specified initial period of stabilization has elapsed, by means of a voltage comparator 7″ or a polarized transistor that can convert the level of the power supply voltage into a binary signal and can transmit it to the processing unit 3.

Furthermore, so as to keep from taking into account unauthenticated data that is deliberately or accidentally received by and transmitted to the product 2, the communication method can implement a secure communications protocol, implementing a coding of data and/or messages that are transmitted and/or validating an authorized transmission after the characteristic product 2 receives an optionally coded message requesting entering into or initiation of communication, and, if necessary, until an end of communication or stop message is received by this product 2.

Figure 5:
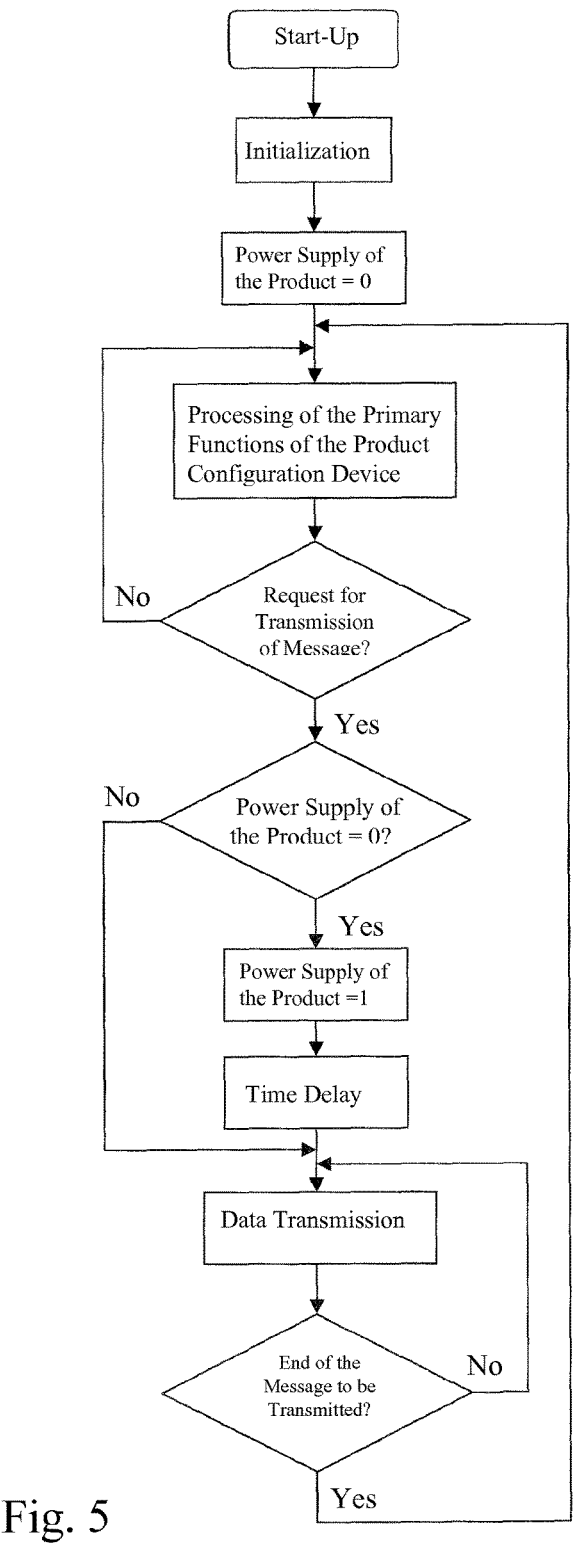
FIG. 5 is a logic diagram illustrating the stages of a procedure example followed by the device of FIGS. 1 and 2 for the transmission of data from the device to the product via the power supply line.

Possible examples of consecutive procedure stages executed at the device 1 and the product 2 are illustrated in the accompanying FIGS. 5 and 6, whose data are sufficient for one skilled in the art. FIG. 4a illustrates an example of binary modulation of the power supply voltage+Valim (data emission from device 1 to the product 2), and FIG. 4B illustrates a possible type of binary output signal (voltage or current) for the emission of data from the product 2 to the device 1.

As FIGS. 7A and 7B diagrammatically show, relative to FIGS. 1 to 6, the invention also relates, in a more global manner, to a method for operation of a smart product 2 which is an actuator, a pre-actuator, a sensor or a detector that is connected, in running operation in its usual application, to at least one evaluation and power supply system 1', by a power supply input or power supply line 4 and by an output interface or output line 5.

This method is characterized in that it includes, during specific temporary phases of configuration, calibration, parameterization, interrogation, testing, diagnosis, or the like, in connecting the product 2 to the device 1 for configuration, interrogation and/or diagnosis by its power supply input or power supply line 4 and by its output interface or output line 5, optionally after having detached the product 2 from the power supply system 1' and in implementing the communication method as described above.

As FIGS. 7A and 7B show, the device 1 and the power supply system 1' are generally physically separate, with the device 1 optionally being an easily transportable, nomadic device that can easily be installed temporarily on the installation site of the product 2 in question or close to the power supply system 1'.

Figure 1:
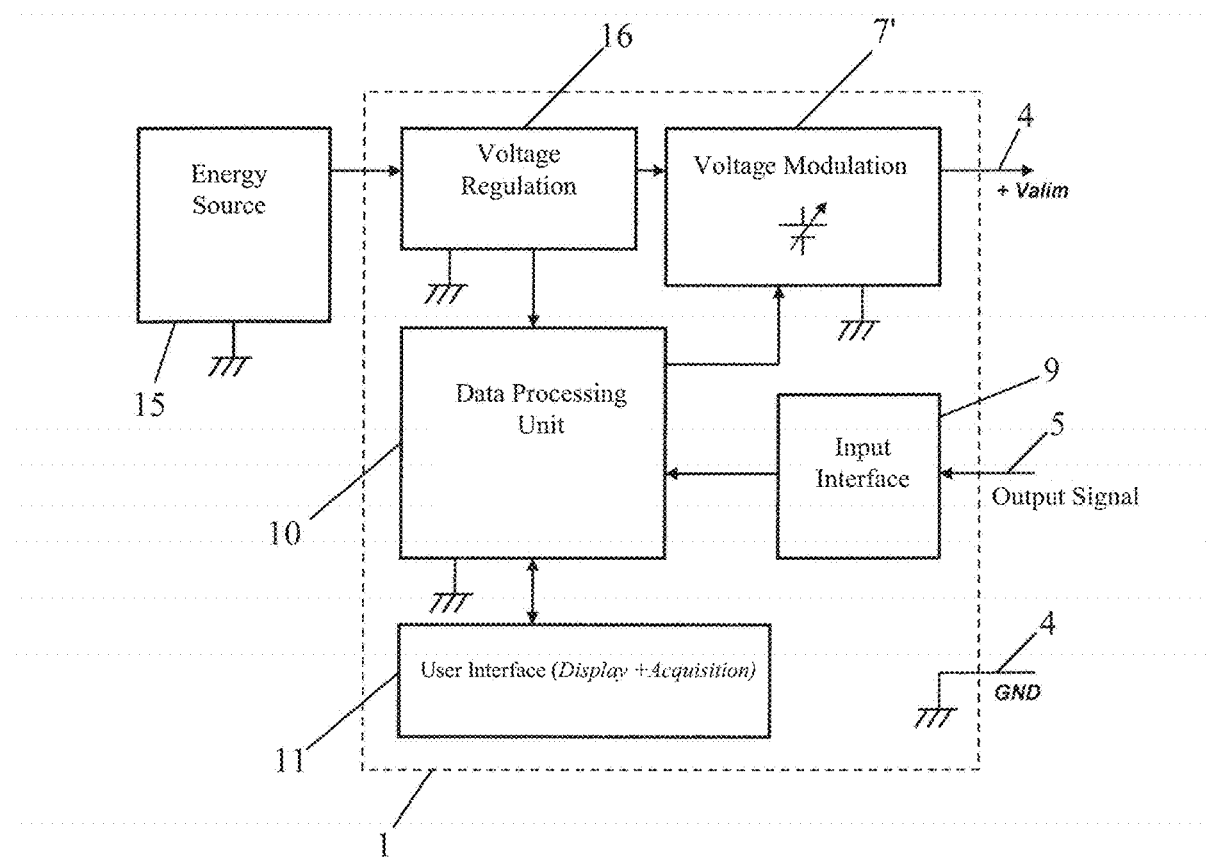
FIGS. 1 and 2 are synoptic representations of a device that is part of a system for the implementation of the method according to the invention, in accordance with two embodiments.
Figure 2:
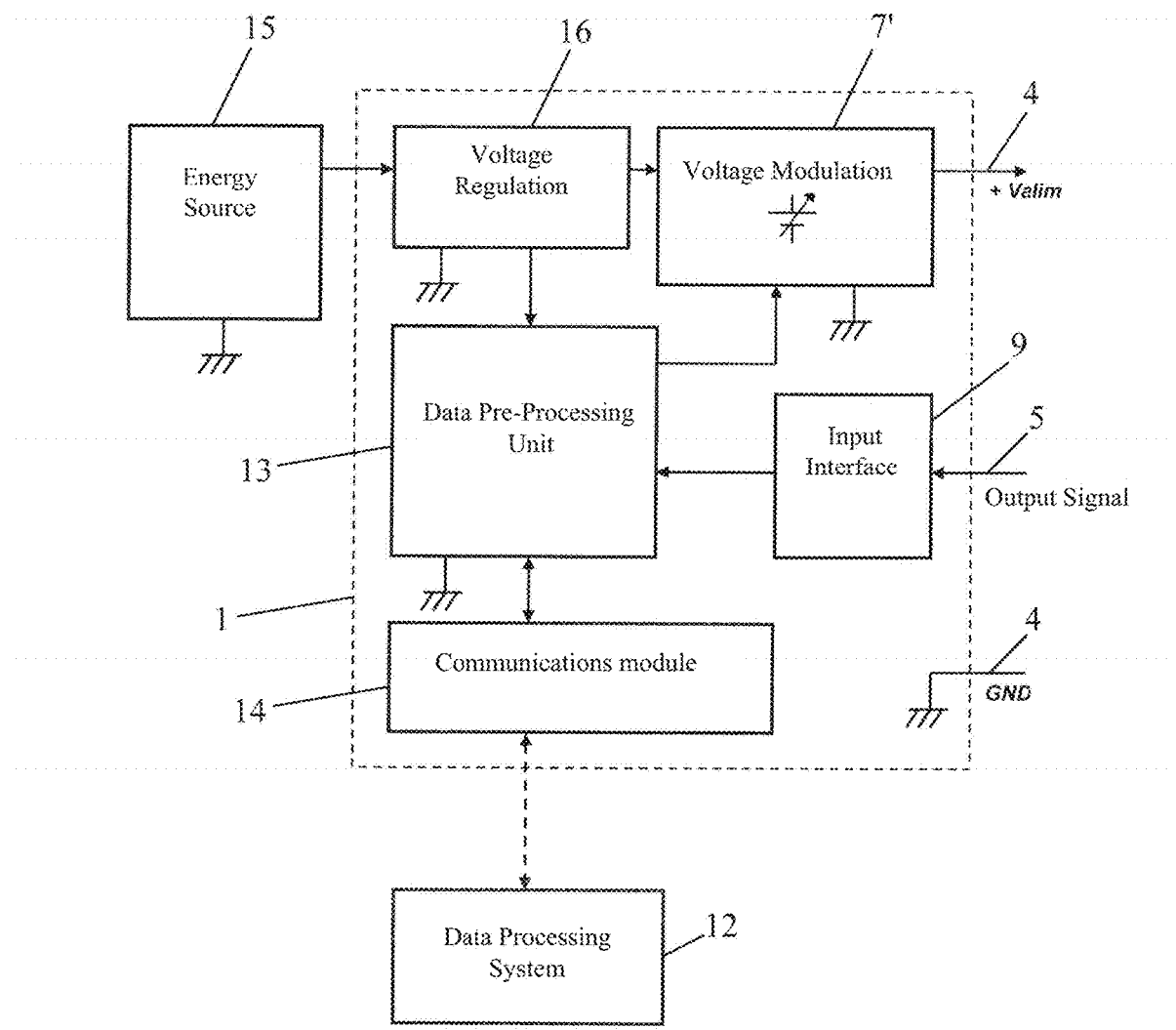

The invention also provides, as is evident at least partially from FIGS. 1 to 3, a system for implementing the unidirectional or bidirectional communication method, described above.

This system comprises a device 1 for configuration and/or interrogation and at least one configurable and/or interrogatable product 2, respectively master and slave during the temporary communication between them.

The or each product 2 includes a smart product selected from the group that is formed by the actuators, the pre-actuators, the sensors, and the detectors that are smart, and the product is able to be connected to the device 1 by means of its direct current power supply line 4, as well as, if necessary, by its output interface or its output line 5.

The at least one product 2 comprises at least one processing unit 3, and preferably at least one other functional component or element 6 (able to perform the primary function in particular of the product 2).

This system is characterized in that the device 1 and the or each product 2 comprise functionally complementary respective means 7, 7' for the transmission from the device 1 to the or each product 2 of data that can be interpreted by the processing unit 3 in question, with the transmission being performed by means of the power supply line 4 and via a modulation of the power supply voltage, and in that the or each product 2 integrates an output interface or an output stage 8 connected to an input stage or an input interface 9 of the device 1, allowing a wire transmission of data from the product or products 2 to the device 1, in the form of analog or binary signals.

One skilled in the art easily understands that the device 1 can be connected to a single product or to several products 2, based on its design and its circumstances of use.

Advantageously, the device 1 comprises a voltage modulation circuit or component 7' in a specified range of values, compatible with a satisfactory power supply of the connected product or products 2, and the or each product 2 comprises a voltage demodulation component or circuit 7, such as, for example, a voltage comparator, whose output is connected to the processing unit 3 of the product 2 in question, with the data transmission being performed in asynchronous serial form, if necessary with implementation of a secure communications protocol.

Although a wireless transmission of the product 2 to the device 1 can be considered, and is even provided in the initial design of the product 2, when the product 2 is in communication, it is preferred that the or each product then integrates, advantageously in its initial design, an output interface or an output stage 8 connected to an input stage or an input interface 9 of the device 1, allowing a wire transmission of data from the product or products 2 to the device 1, in the form of analog or binary signals. The product 2 can then also integrate a voltage regulation module 16.

In accordance with a first structural variant, shown in FIG. 1, the device 1 is an optionally portable, autonomous device, also integrating a data processing unit (10) for management and processing of information and a bidirectional user interface 11, as well as optionally a voltage regulation module 16 (for example, a DC/DC converter).

In accordance with a second structural variant, shown in FIG. 2, the device is a dependent device, accessory of a computer processing system 12, integrating a data pre-processing unit 13 and a wireless or wired communications module 14 with the system 12 (an energy source 15 and a voltage regulation module 16 can also be provided).

The product 2 includes, for example, a smart product such as sensors, detectors, pre-actuators, or actuators that are smart, integrating at least one processing unit 3 and a voltage demodulation means 7, as well as at least one other functional element 6, whereby the product 2 is able to be used within the framework of the method according to any of claims 1 to 7, for the purposes of configuration and/or interrogation, and to be part of the system as described above.

Preferably, the product 2 is a smart wired detector or sensor.

Below, the invention will be described in a more detailed, but nonlimiting, manner, in relation to the accompanying drawings.

The invention is based on the observation that any product 2 powered by an outside source has a power supply range and, at a minimum, two wires (or pins) dedicated to its power supply (power supply line 4 consisting of wires+Valim and GND).

By modulating (inside an operating range that is compatible therewith) the amplitude of the power supply voltage of a product 2 powered by an outside source, it is both possible to power this product 2 correctly and transmit from it simultaneously data that are useful for the purposes of calibration, diagnosis, configuration or interrogation.

Likewise, and since the product 2 of the configurable and/or interrogatable type has at least one output 5 (all-or-nothing or the like), managed directly or indirectly by a data processing unit 3 (MCU, ASIC, ASSP, . . . ), it is possible in response to receive (if necessary) any type of data that would be stored therein from this product 2.

This communication mode based on the power supply and the simultaneous sending of data, without thereby resorting to specific data lines or to a dedicated connector, is particularly suitable for the production of products 2 such as proximity detectors (that may or may not be parameterizable). Actually, this type of product currently has—most of the time—all of the elements required for ensuring communications according to the above-mentioned principle, and therefore an open functionality to the outside for the purposes of calibration, diagnosis, configuration or interrogation.

Of course, numerous other types of products having a direct current power supply line 4 and a data processing unit 3 can advantageously exploit the method according to the invention.

As FIGS. 1 and 2 illustrate, in combination, the system has two components, namely a device 1 for configuration and/or interrogation and at least one configurable and/or interrogatable product 2 (the following description is based on the example with a single product 2).

The device 1 for configuration and/or interrogation transmits to the connected product 2 the energy and the signals that are useful in the sending of messages.

The device 1 for configuration and/or interrogation also ensures the processing of messages coming from the interrogated product 2 when the latter emits them and is equipped with suitable means (output 5/interface 8).

The device 1 for configuration and/or interrogation can be presented in two variant embodiments, namely:

- An autonomous device 1, for example in the form of a box powered by an on-board or external power supply source 15 (cell, battery, . . . ), displaying all or part of the data useful for the purposes of calibration, diagnosis, configuration or interrogation (FIG. 1A),
- A device 1 in the form of a piece of accessory equipment that is dependent, for example, in the form of an associated interface, via a suitable link (wired or not), upon a system endowed with a capacity for data processing (PC, tablet, . . . ), with the whole forming a useful assembly for the purposes of calibration, diagnosis, configuration or interrogation.
- The interface 1 can then be powered by an on-board or external power supply source (cell, battery, . . . ).

While being connected directly to the product 2, the device 1 or the assembly 1, 15 of configuration can also be used for carrying out functional tests of the products 2 that may or may not be configurable, since the latter use similar electrical characteristics (voltage range, consumption, type of output, . . . ).

Measurements (consumption, control of the type of output, switching of outputs, . . . ) can thus be carried out by the device 1 for configuration and/or interrogation that becomes, under these circumstances, a device 1 for testing the related product 2.

More particularly, in relation to the operating principle of the method according to the invention, it is provided that the messages are transmitted to the product 2 in asynchronous serial form via a modulation of the power supply voltage provided to the product 2.

As a result, while being based on a wired communication mode, no line suitable for communications is necessary, since only the existing power supply line 4 of the product 2 is used to transmit data to it.

To enter into contact with a product 2, the configuration and/or interrogation device 1 uses a power supply management module whose amplitude can be modulated.

In a first step, the product 2 that is connected to the device 1 is powered up by the latter. Then, after a period of time has elapsed that is necessary to the initialization of the data processing unit (MCU, ASIC, ASSP), integrated in the product 2, the configuration and/or interrogation device 1 will seek to communicate data to the product 2, by modulating the power supply voltage, in a voltage interval that is compatible with this product.

Starting from this time and since the product 2 can be configured, it can intercept and take into account the transmitted data and even respond in turn to the configuration and/or interrogation device 1, since it has an output 5, 8 (all-or-nothing or analog) so as to return information (data, acknowledgement, . . . ) by modifying the state of the output thereof.

In the case where the configurable product 2 does not have an output 5, 8, the user can note for himself the taking into account of set points via functional changes of the configured product (modification of the characteristics of the product, DEL of state, . . . ).

The access to the product 2 can be done by means of coded messages (keywords), which ensure the security of the communication.

Relative to the configurable and/or interrogatable product 2, the latter is able to interpret signals (data) obtained from the amplitude modulation of the power supply voltage for the purpose of being configured and/or interrogated.

In the case where a response is to be provided (transmissions of information and/or implementation of an acknowledgement), the configurable product 2 responds to the configuration and/or interrogation device 1, preferably by wire means (serial asynchronous), by relying on its—or on one of its—outputs 5 (all-or-nothing or analog).

The operating principle of the product 2 is as follows, for example:

If, over a period of time that follows its powering up, the configurable and/or interrogatable product 2 does not receive a message via the voltage fluctuations controlled by the device 1 for configuration and/or interrogation on the power supply line 4, the function of scanning the message of the configurable product 2 is interrupted, and the data processing unit 3 (MCU, ASIC, ASSP, . . . ) contained in the product 2 is devoted exclusively to the primary task of the product.

As a result, this arrangement prevents the interpretation of signals that could come not from a configuration and/or interrogation device but from power supply fluctuations (perturbations, voltage drops, . . . ).

Conversely, shortly after having been powered up, if a device 1 for configuration and/or interrogation is combined with a configurable product 2, a start-of-communication request (sending a keyword) will reach the configurable product 2 shortly after its initialization, and this configurable product 2 will then devote all of the time that is necessary to this cycle of calibration, diagnosis, configuration or interrogation.

The scanning function of the power supply voltage (voltage demodulation) is accomplished using a simple voltage comparator 7", which—depending on whether the voltage level present on the power supply line 4 is greater than or less than a reference voltage (Vref), converts—in binary form—the level (amplitude) of voltage perceived, for communicating its state to the data processing unit 3 (MCU, ASIC, ASSP, . . . ).

To carry out the scanning function (demodulation) of the power supply voltage—and unless the admissible power supply voltage range of the product is not very limited—a simple correctly polarized transistor may be suitable. Such a selection then contributes to the economical aspect and to the small space requirement of the solution.

In the case where the admissible voltage range of the product 2 is very limited, a voltage comparator 7" can be implemented for demodulating the voltage level (amplitude) with the precision required before communicating it to the data processing unit 1 (MCU, ASIC, ASSP, . . . ).

An example of the communications principle that is carried out between the configuration device and the configurable product is presented in detail in the logic diagrams as well as in the attached timing diagram.

Among the primary advantages being derived from the invention, in relation to the variants and the characteristics used, it is possible to note in particular:

A very low production cost:

The interpretation of signals emitted from the amplitude modulation of the power supply voltage is accomplished in a simple manner, via very economical components (transistor or comparator).

The majority of components implementing this communication mode are contained in the device 1 for configuration and/or parameterization and not in the product 2.

In addition, no particular connection means (connector, cable or wireless communication device) is necessary at the product 2.

The preservation of the initial appearance of the product 2:

The provision of such a communications principle modifies neither the shape nor the outside appearance of the product 2.

Actually, no additional connector or cable is necessary. Likewise, no wireless communication device (optics, radio, RFID, magnetic coupling, . . . ) is used.

The compactness:

Very few components and therefore very little additional space are necessary to a product 2 that is equipped with such a communication mode.

The accessibility:

The communication can be carried out remotely including on an existing installation and without physically having access to the product 2, unlike a good number of products relying on a wireless communication mode (optics, radio, RFID, magnetic coupling, . . . ) that often require being in the vicinity or within visual range so as to communicate in a reliable way with the product 2.

The relatively long communication distance:

Based on the characteristics of the product 2 (range of power supply voltage, current consumed, impedance) and a cable serving as the power supply line 4 that is used to power the product 2 (essentially resistance and capacity), it is possible to exploit the amplitude modulation of the power supply voltage to communicate at several tens, and even several hundreds, of meters.

The invention is not limited to the embodiments described and shown in the accompanying drawings. Modifications remain possible, in particular from the standpoint of the composition of the various elements or by substitution of equivalent techniques, without thereby exceeding the scope of protection of the invention.

The invention claimed is:

1. A method for temporary communication between a device (1) and a product (2), comprising:
   during a first period of temporary communication, operating the device (1) as a master unit and the product (2) as a slave unit,
   wherein the first period of the temporary communication is separate from a second period of operating the product (2) independent of the device (1), with the product (2) being connected to least one evaluation and power supply system (1') and running operatively an application,
   wherein the product (2) comprises at least one data processing unit (3), a power supply line (4), and an output line (5); and
   during the first period of the temporary communication, with the device operating as the master unit and the product operating as the slave unit, operating the device (1) for at least one of the group consisting of configuration, calibration, parameterization, interrogation, diagnosis, and testing of the product (2),
   wherein during said operation during the first period of the temporary communication:
   i) the device (1) and the product (2) are connected together by the power supply line (4) and by the output line (5),
   ii) the device (1) transmits data to the product (2), the data being transmitted to the product (2) as a modulated power supply voltage on the connected power supply line (4),
   iii) the transmitted data is interpreted by the data processing unit (3) of the product (2) sensing the modulated power supply voltage from the power supply line (4), and
   iv) the product (2) transmits further data to the device (1) by the output line (5) connected to said device (1).

2. The method according to claim 1, wherein the data are transmitted in asynchronous serial form, and wherein the modulation of the modulated power supply voltage is done within a specified range of values.

3. The method according to claim 1, wherein the data transmitted to the product (2) by the power supply line (4) includes a message of configuration or parameterization of at least one function of the product (2).

4. The method according to claim 1, wherein the data transmitted to the product (2) by the power supply line (4) includes a message of interrogation that causes a transmission of the further data from the product (2) to the device (1) by the output line (5) connected to said device (1).

5. The method according to claim 1, wherein the data transmitted to the product (2) by the power supply line (4) includes a message requesting a test or diagnosis of the product, the message requesting a test or diagnosis of the product causing a transmission of the further data from the product (2) to the device (1) by the output line (5) connected to said device (1).

6. The method according to claim 1, further comprising a step of the product (2) scanning of the power supply voltage using a voltage comparator (7") to convert a level of the power supply voltage into a binary signal and transmits the binary signal to the data processing unit (3) of the product (2).

7. The method according to claim 1, further comprising implementing a secure communications protocol using a coding of data that are transmitted.

8. The method of claim 1, wherein, prior to said first period of the temporary communication, the product is disconnected from said least one evaluation and power supply system (1').

9. The method according to claim 1, wherein the data transmitted by the power supply line (4) includes a message of configuration or parameterization of at least one functional element (6) of the product (2).

10. The method according to claim 1, wherein the data transmitted by the power supply line (4) includes a message of interrogation, the message causing a transmission of data from the product (2) to the device (1) by the output line (5) connected to said device (1), with said data transmitted from the product (2) to the device (1) being data stored or data resulting from operations performed by the data processing unit (3) of the product (2) by a functional element (6) of the product, under the control of the functional element (6) of the product.

11. The method according to claim 1, wherein the data transmitted by the power supply line (4) includes a message requesting a test or diagnosis of the product, the message causing a transmission of data from the product (2) to the device (1) by the output line (5) connected to said device (1), with said data transmitted from the product (2) to the device (1) being stored data or resulting from operations carried out by the data processing unit (3) of the product (2) by a functional element (6) of the product, under the control of the functional element (6) of the product.

12. The method of claim 2, wherein, prior to said first period of the temporary communication, the product is disconnected from said least one evaluation and power supply system (1').

13. The method according to claim 1, wherein said product is one of the group consisting of an actuator, a pre-actuator, a sensor, and a detector.

14. A system for implementing a method of temporary communication, comprising:
a device for at least one of the group consisting of configuration and interrogation; and
at least one product that is at least one of the group consisting of configurable and interrogatable,
wherein during the temporary communication, the device operates as a master and the product operates as a slave,
wherein the at least one product (2) is a smart product that is selected from the group consisting of actuators, pre-actuators, sensors and detectors that are smart and being able to be connected continuously to an evaluation and power supply system (1') and temporarily to said device (1), by a direct current power supply line (4) of the product and by an output line (5) of the product,
said at least one product (2) comprising at least one data processing unit (3), and at least one other functional element or component, and
the device (1) and the at least one product (2) comprising respectively a voltage modulation means and a voltage demodulation means for transmission of data from the device (1) to the at least one product (2), wherein the data transmitted to the product (2) can be interpreted by the at least one data processing unit (3) of the at least one product (2), said transmission being performed by the power supply line (4) and via a modulation of the power supply voltage, and the at least one product (2) integrating an output stage (8) connected to an input interface (9) of the device (1), allowing a wire transmission of data from the at least one product (2) to the device (1), in the form of binary or analog signals.

15. The system according to claim 14, wherein the voltage modulation means of the device (1) comprises a voltage modulation circuit or component (7') that modulates the transmitted data in a specified range of values, and
wherein the voltage demodulation means of the at least one product (2) comprises a voltage comparator (7"), whose output is connected to the data processing unit (3) of the at least one product (2), with the data transmission being performed in asynchronous serial form.

16. The system according to claim 14, wherein the device (1) is a portable, autonomous device, comprised of a data processing unit (10) for management and processing of information and a bidirectional user interface (11).

17. The system according to claim 14, wherein the device (1) is a dependent device, accessory of a computer processing system (12), and comprises a data pre-processing unit (13) and a wireless communications module (14) for wireless communication with the computer processing system (12).

18. The system according to claim 15, wherein the device (1) is an autonomous device, comprising a data processing unit (10) for management and processing of information and a bidirectional user interface (11).

19. The system according to claim 15, wherein the device (1) is a dependent device, accessory of a computer processing system (12), comprising a data pre-processing unit (13) and a wireless communications module (14) for wireless communication with the computer processing system (12).

20. A product comprising:
at least one data processing unit (3), a voltage demodulation functional element (7), and at least one other functional element (6),
wherein the product is at least one of the group consisting of smart, configurable and interrogatable,
wherein the product is at least one of the group consisting of a sensor, a detector, and an actuator,
wherein during a first period of temporary communication with a device (1), the device (1) operates as a master unit and the product (2) operates as a slave unit,
wherein the first period of the temporary communication is separate from a second period of operating the product (2) independent of the device (1) during a running operation with the product (2) being connected to least one evaluation and power supply system (1'), and
wherein during the first period of the temporary communication, with the device operating as the master unit and the product operating as the slave unit:
i) the device (1) and the product (2) are connected together by a power supply line (4) and by an output line (5),
ii) the device (1) transmits data to the product (2), the data being transmitted as a modulated power supply voltage on the connected power supply line (4),
iii) the transmitted data is interpreted by the data processing unit (3) of the product (2) sensing the modulated power supply voltage from the power supply line (4), and
iv) the product (2) transmits further data back to the device (1) by the output line (5) connected to said device (1).

* * * * *